March 22, 1966     D. A. DOTSON     3,242,347
GAS TURBINE LOAD SHARING AND ANTI-LOAD EXCHANGING SYSTEM
HAVING INTERCONNECTED FUEL LINES
Filed May 29, 1963
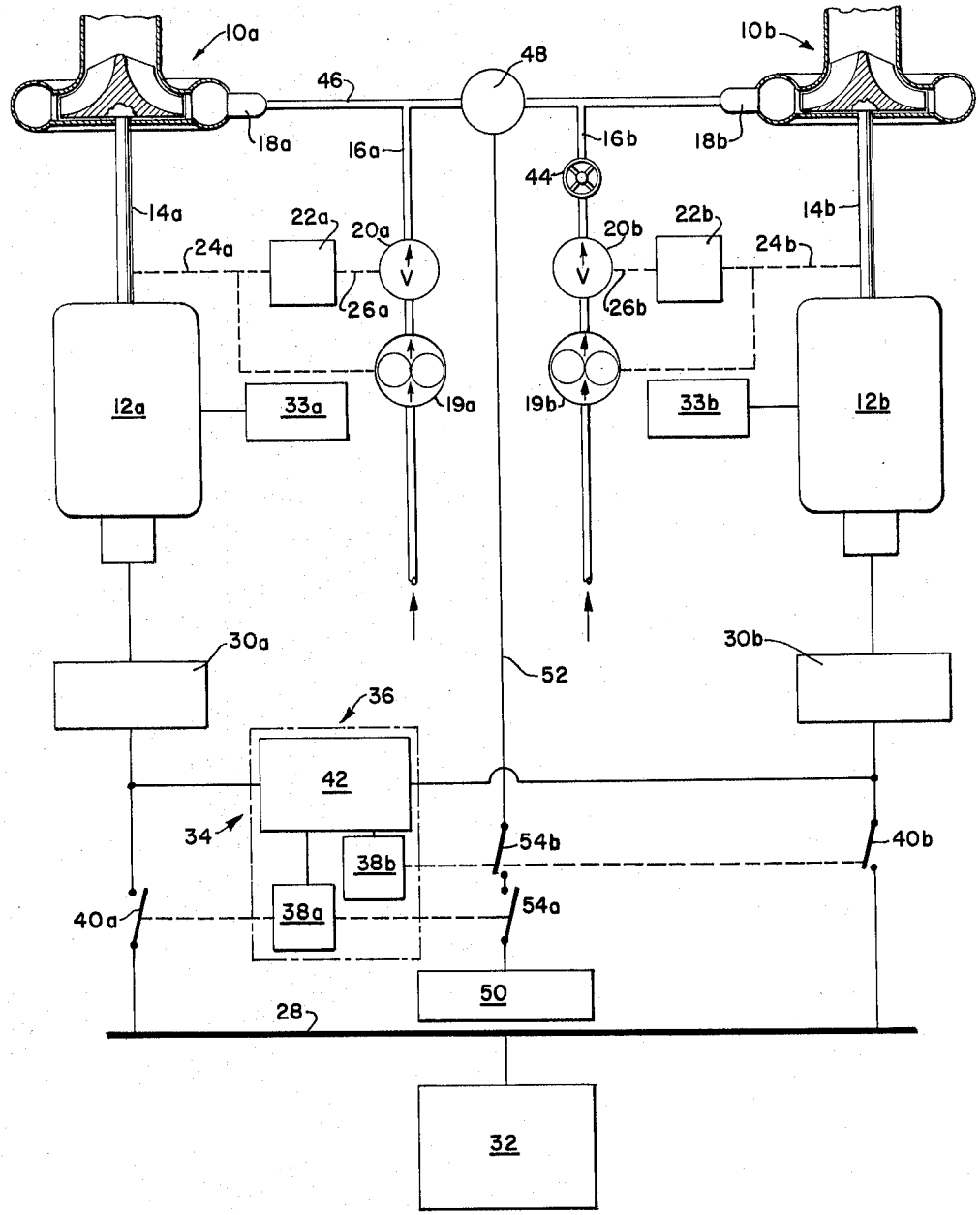
INVENTOR:
DONALD A. DOTSON,
BY
Attorney.

United States Patent Office 3,242,347
Patented Mar. 22, 1966

3,242,347
GAS TURBINE LOAD SHARING AND ANTI-LOAD EXCHANGING SYSTEM HAVING INTERCONNECTED FUEL LINES
Donald A. Dotson, Redondo Beach, Calif., assignor to The Garrett Corporation, Los Angeles, Calif., a corporation of California
Filed May 29, 1963, Ser. No. 284,116
12 Claims. (Cl. 290—40)

This invention relates generally to the art of operating gas turbines and more particularly to a method of and means for paralleling gas turbines.

A problem which has existed in the field of electrical power generation since the advent of gas turbine-driven generators is paralleling two or more such turbine-generator units to share a common electrical load without load exchanging or "swapping" between the units. To understand the phenomenon of load swapping, assume a simple electrical power generating system composed of two alternators connected to a common load bus and each driven by its own gas turbine. A typical gas turbine for this purpose is equipped with a fuel metering valve which is controlled by a governor driven from the turbine output shaft. By appropriately setting the governor, the frequency of the alternator output voltage may be fixed within the limits of accuracy of the governor.

In the simple power generating system under consideration the two turbine-alternator units are assumed to have similar characteristics and to be set for the same turbine speed, whereby the alternators generate the same output frequency. During normal operation of such a power system, with the alternators connected to a common load bus, as mentioned, the output voltages of the two alternators are just slightly out of phase so that a small synchronizing current circulates between the alternators which locks the latter in synchronism. Thus, under normal operating conditions, the alternators share their common load substantially equally. If such a power system were inherently stable in this normal operating condition, then, there would be no need to equip the system with means to prevent load swapping between the turbine-alternator units.

It is well-known in the art, however, that such a power system is not stable. Thus, all speed governing systems, such as those used on gas turbines, have an inherent hunting action. In the particular power system under consideration, for example, each turbine governor hunts independently of the other turbine governor with the result that the speed of each turbine, and its respective alternator, tends to fluctuate slightly about the speed for which the governor is set and independently of the other turbine and alternator. Since the two alternators of the power system are electrically locked together, or synchronized, by the synchronizing current which circulates between them, the relative speeds of the turbine-alternator units cannot change to any appreciable extent. In other words, any slight increase in the speed of one unit causes an immediate change in the relative phase of the alternator outputs and, thereby, in an immediate increase in the synchronizing current. This increase in synchronizing current, in effect, motorizes the lagging alternator to maintain the two turbine-alternator units at substantially the same speed.

Because of this tendency of the relative speeds of the gas turbines to fluctuate independently of one another, due to hunting of their speed governors, while the alternator speeds are synchronized by the synchronizing current circulating between them, as the speed of one alternator tends to increase relative to the speed of the other alternator, the leading alternator assumes a greater share of the common load, thereby removing a portion of the load from the lagging alternator and increasing the relative phase angle of the alternator output voltages. This increased loading of the leading alternator immediately tends to slow it while the decrease in loading on the lagging alternator tends to increase the speed of the latter. The relative phase angle of the alternator output voltages is thereby reversed and increases in the opposite direction. The previously leading alternator now becomes the lagging alternator which is motorized by the synchronizing current. The previously lagging alternator, whose speed is currently tending to increase, immediately removes a portion of the load from the other alternator, whereby the shift in alternator loading again tends to slow the now leading alternator and increase the speed of the other alternator. Accordingly, the relative phase angle of the alternator output voltages again reverses and increases.

As a consequence of this load shifting from one alternator to the other, or load swapping, as it is commonly called, and the resultant fluctuations of the alternator output voltages, electrical oscillations of rapidly increasing amplitude are established in the synchronizing current circulating through the alternators. Power systems of the kind under discussion are, of course, commonly equipped with overload protective relays for the alternators. The electrical oscillations which are created in the alternator synchronizing current rapidly increase in amplitude to the point where they trigger the protective relay of one or both alternators, thereby removing the latter from the line. In actuality, this action occurs in a very brief instant of time so that it is totally impossible to operate a power system of the kind described without providing the system with means to prevent load swapping between the alternators.

In practice, such destructive load swapping occurs only in power systems which utilize power units having low droop characteristics, such as the high speed, relatively low-inertia gas turbine driven alternators with which this invention is concerned. Thus, a power system which utilizes power units having high droop characteristics, such as alternators driven by piston engines, possesses sufficient damping to eliminate excessive and rapid loading swapping.

Many and varied means have been devised to minimize or eliminate load swapping in gas turbine power systems of the kind described. These prior anti-load swapping means, however, are, in general, very complex, costly, and otherwise deficient.

A general object of the present invention is to provide a method of and means for paralleling gas turbines, particularly gas turbines which drive electrical generators coupled to a common load, substantially without load swapping between the turbines or generators.

Another object of the invention is to provide a method and means for the purpose described which are characterized by their extreme simplicity, economy, and other highly desirable features of construction and practice.

Other objects, advantages, and features of the invention will present themselves to those skilled in the art as the description proceeds.

Briefly, the objects of the invention are attained by providing a method of and means for paralleling gas turbines wherein the fuel lines of the turbines are interconnected, between their respective fuel metering valves and fuel injection nozzles, by an equalizing fuel line containing a normally closed equalizing valve. According to the illustrative practice of the invention, this equalizing valve is opened automatically in response to matching of the amplitudes, phase angles, and frequencies of the alternator output voltages.

Opening of the equalizer valve places the fuel inlets of the turbines in direct communication. As a consequence, fluctuations in the fuel inlet pressure to each turbine, resulting from hunting of the speed governor of the respective turbine, are simultaneously transmitted to all of the turbines of the system. Thus, hunting of the governor of each turbine affects the speed of all turbines simultaneously. As a result, each alternator acts, in effect, to oppose or damp load changes of the other alternators, whereby load swapping between the alternators is greatly minimized or eliminated. It is obvious, of course, that the invention is susceptible of application in systems other than the particular power system disclosed herein for illustrative purposes.

A better understanding of the invention may be had from the following detailed description taken in connection with the annexed drawings wherein:

The single figure of the drawing diagrammatically illustrates an electrical power generating system embodying the anti-load swapping means of this invention.

The electrical power generating system illustrated in these drawings comprises two gas turbines 10a and 10b driving electrical generators, or alternators, 12a and 12b through shaft connections 14a and 14b, respectively. Turbines 10a and 10b have fuel lines 16a and 16b, respectively, leading from a fuel supply (not shown) to fuel injection nozzles 18a and 18b in the respective turbines. It should be noted at this point that the turbines may receive their fuel from a common fuel supply or from separate fuel supplies and that the invention is adapted for use with both liquid-fueled and gas-fueled turbines. The required fuel injection pressure at the turbine nozzles may be attained by turbine-operated fuel pumps in the turbine fuel supply lines, as shown at 19a and 19b. Alternatively, the required fuel injection pressure may be attained by the use of a pressurized fuel supply, as in the case of gas-fueled turbines supplied from a natural or other fuel gas main. In these fuel lines are fuel metering valves 20a and 20b which meter the fuel flow to the respective turbine nozzles. Turbines 10a and 10b are equipped, in the usual way, with speed responsive governors 22a and 22b which may be of the centrifugal type. Governors 22a and 22b are drivably coupled to their respective turbines by drive connections diagrammatically illustrated at 24a and 24b, so as to be responsive to their respective turbine speeds. Diagrammatically illustrated at 26a and 26b are means which operatively connect the governors 22a, 22b to the fuel metering valves 20a and 20b, respectively, whereby each valve is controlled or positioned by the respective governor in response to the speed of the respective turbine. The turbine speed governing systems including the speed governors 22a, 22b and the fuel metering valves 20a, 20b controlled thereby are effective to maintain the turbine speeds constant at the values for which the governors are set. In most cases, the turbine governors are adjusted to the same speed setting, although this is not essential to the invention.

The electrical output terminals of the alternators 12a, 12b are electrically connected to a common load bus 28 through the usual protective circuits or systems 30a and 30b, respectively. These protective systems include the customary overload relays (not shown) which open in response to excessive current flow through their respective alternators to disconnect the latter from the load bus 28. Load bus 28 is connected to a load 32 to be powered by the alternators 12a, 12b.

As discussed earlier, a synchronizing current circulates between the alternators 12a, 12b, through the load bus 28, during operation of a power system of the kind under discussion. Unless the output voltages of the alternators are substantially matched in phase, frequency, and amplitude when both alternators are connected to the load bus, the synchronizing current will be excessive and will immediately trigger the overload relays for the alternators. To this end, the alternators 12a and 12b of the illustrated power system are equipped with conventional voltage regulators 33a and 33b suitable for parallel operation which maintain the desired alternator output voltages.

Also, the illustrated power system is equipped with the customary means 34 for synchronizing the alternators before the latter are both connected to the load bus. This synchronizing means comprises, in the usual way, a conventional synchronism system 36 which is electrically connected between the alternator output terminals, as shown, whereby the output voltages of both alternators 12a and 12b are impressed on the synchronizing circuit through the overload protective circuitry of the alternators. Included in the synchronizing system 36 are the usual relays or circuit breakers 38a and 38b having normally open contactors 40a and 40b, respectively, connected in series between the alternators 12a, 12b and the load bus 28, as shown. Thus, each alternator is isolated from the load bus until its respective contactors 40a or 40b are closed.

Synchronizing system 36 further includes a synchronizing circuit 42 for sensing and comparing the phase angles, frequencies, and amplitudes of the alternator output voltage impressed on the synchronizing system and for actuating the relays or circuit breakers 38a, 38b in the manner described below. It is considered to be within the scope of the invention, for example, that the synchronizing circuit 42 may comprise a simple electrical load including lamps which are arranged, in the well-known way, to be energized by the alternator outputs in such manner that the lamps remain lighted whenever the alternator output voltages differ in phase, frequency, or amplitude and which becomes dark when the output voltages have the same frequency, amplitude and phase angle. In this case, the circuit 42 would include means for manually operating the relays 38a, 38b to close the contactors 40a, 40b.

According to the preferred practice of the invention, however, the synchronizing circuit 42 comprises any one of the several well-known automatic synchronizing circuits for paralleling alternators. A typical synchronizing circuit for this purpose is equipped with a "Start" button or other means for initially activating the circuit. Once activated in this way, the circuit is rendered effective to sense and compare the phase angles, frequencies and amplitudes of the alternator output voltages and to operate one of the relays or circuit breakers 38a, 38b, say relay 38a, in response to the output voltage of the corresponding alternator, i.e. alternator 12a, attaining the proper frequency and amplitude. This operation of relay 38a closes its contactors 40a to connect the alternator 12a to the load bus 28. Such a synchronizing circuit also compares the phase angles, amplitudes, and frequencies of the alternator output voltages and operates the other relay 38b, to close its contactors 40b and thereby connect alternator 12b to the load bus, upon the phase angle, amplitude, and frequency of the output voltage of the latter alternator matching those of alternator 12a.

When starting the power system, therefore, it is necessary to regulate the phase angle, amplitude, and frequency of the output voltage of one alternator, namely alternator 12b, to match the latter voltage to that of alternator 12a. The amplitudes of the voltages are regulated automatically, of course, by the voltage regulators 33 of the alternators. Regulation of the phase angle and frequency of the output voltage of alternator 12b may be accomplished in various ways. The illustrated power system, for example, is equipped for this purpose with a valve 44 in the fuel line 16b of turbine 10b. When starting the system, this valve is adjusted to regulate the turbine speed until the frequency and phase angle of the output voltage of alternator 12b match those of alternator 12a and, thereby, the contactors 40b are closed to connect the latter alternator to the load bus 28. The valve 44 is then immediately returned to its full open position. Conceivably, this operation of the valve may be automatic and locked into the synchronizing circuit 42. The phase angle and frequency of the output of alternator 12b may be regulated in other ways, such as by adjusting the governor for turbine 10b.

The electrical power generating system thus far described is generally conventional and is subject to the inherent deficiency discussed earlier. In other words, if a system of this kind were operated, a synchronizing current would circulate between the alternators 12a, 12b, through the load lines 28. Because of hunting in the turbine governors 22a, 22b, and the resultant load swapping between the alternators, electrical oscillations would rapidly build up in the synchronizing current and would almost immediately attain a sufficient amplitude to open the overload protective relay of one or both alternators.

According to the present invention, this deficiency is simply cured by the provision of an equalizing fuel line 46 having a normally closed equalizing valve 48 therein. Equalizing line 46 communicates the turbine fuel lines 16a, 16b between the fuel metering valves 20a, 20b and the fuel injection nozzles 18a, 18b. In this way, when the equalizing valve 48 is open, the fluctuations in fuel pressure caused by hunting of each turbine governor 22a, 22b are transmitted to and react on both turbines 10a and 10b simultaneously. As a consequence, such fuel pressure fluctuations tend to increase and decrease the speed of both turbines simultaneously. Each turbine, therefore, acts, in effect, to damp the load swapping tendency of the other turbine, whereby load swapping between the turbines, and the synchronizing current oscillations resulting therefrom, are substantially minimized or eliminated. In an actual light weight, high speed, low inertia power system constructed in accordance with the invention, for example, the output frequency deviation was less than 1 percent.

According to the earlier description, one of the alternators, which was assumed to be alternator 12a, is connected to the load first, and the other alternator 12b is connected to the load after the phase, frequency, and amplitude of its output voltage match those of alternator 12a. At this point it should be noted, however, that both alternators may be connected to the load simultaneously after their voltages have been matched. The former method of sequential connection of the alternators to the load is the one most commonly employed, however, and will be assumed to be the method followed herein.

Now it is obvious that if the equalizing valve 48 were opened prior to connecting alternator 12b to the load, turbine 10b would immediately overspeed. Accordingly, it is the preferred practice of this invention to open the equalizing valve simultaneously with connection of both alternators 12a and 12b to the load. This is accomplished as follows in the illustrated power system.

The equalizing valve 48 is a solenoid-operated valve which is energized from an electrical power supply 50 through an electrical circuit 52. Included in this circuit are a first set of contactors 54a, which are shown to comprise a contactor set of the relay or circuit breaker 38a, and a second set of contactors 54b, which are shown to comprise a contactor set of relay or circuit breaker 38b. Contactors 54a and 54b are normally open and connected in series between the equalizing valve 48 and its power supply 50. It is evident, therefore, that the equalizing valve is opened only when both relays 38a, 38b are operated by the synchronizing circuit 42 to connect both alternators 12a, 12b to the load. It is further obvious that if the overload protection relay of either alternator opens, thereby removing the respective alternator from the load, the equalizing valve 48 should be reclosed to prevent overspeeding of the unloaded turbine. To this end, the synchronizing circuit 42 is connected to receive the alternator output voltages through the protective circuits 30a and 30b, as shown. Thus, if the overload relay of either alternator opens to disconnect its alternator from the load, the corresponding circuit breaker or relay 38a or 38b is de-energized, thereby opening its contactors 40a, 54a or 40b, 54b, as the case may be. Opening of either contactors 54a or 54b, of course, recloses the equalizing valve 48.

The invention herein described and illustrated is therefore obviously capable of attaining the objects and advantages preliminarily set forth.

Numerous modifications in the design, arrangement of parts and instrumentalities of the invention are possible, of course, within its spirit and scope.

I claim:
1. In combination:
a plurality of gas turbines each including an output shaft, a fuel injection nozzle, a fuel supply line communicating with the nozzle, and a governor-controlled fuel metering valve in the fuel supply line;
an equalizing fuel line interconnecting the fuel supply lines of said turbines between the fuel metering valves and fuel injection nozzles of the respective turbines;
valve means in said equalizing line for selectively isolating the fuel supply lines of said turbines from one another or placing said fuel supply lines in communication with one another, fluctuations in the supply of fuel to one turbine being transmitted to all turbines simultaneously when said fuel lines are in communication; and
means coupled to said gas turbine shafts for comparing the phase relationships thereof and for providing a valve opening signal for said valve means upon the advent of a predetermined matching characteristic of said shaft phase relationships.

2. An electrical power generating system, comprising:
a plurality of electrical generators;
a gas turbine coupled to each generator for driving the latter;
each turbine including a fuel injection nozzle, a fuel supply line communicating to the nozzle, and a governor-controlled fuel metering valve in the fuel line;
an equalizing fuel line interconnecting the fuel supply lines of said turbines between the fuel metering valves and fuel injection nozzles of the respective turbines;
valve means in said equalizing line for selectively isolating the fuel supply lines of said turbines from one another or placing said fuel supply lines in communication with one another, fluctuations in the supply of fuel to one turbine being transmitted to all turbines simultaneously when said fuel lines are in communication; and
generated electrical power comparison means coupled with both said generators for providing a signal for actuation of said valve means to open position.

3. An electrical power generating system, comprising:
a plurality of electrical generators;
a gas turbine coupled to each generator for driving the latter;
each turbine including a fuel injection nozzle, a fuel supply line communicating to the nozzle, and a governor-controlled fuel metering valve in the fuel line;
an equalizing fuel line communicating the fuel supply lines of said turbines between the fuel metering valves and fuel injection nozzles of the respective turbines;
valve means in said equalizing line for selectively isolating the fuel supply lines of said turbines from one another or placing said fuel supply lines in communication;
fluctuations in the supply of fuel to one turbine being transmitted to all turbines simultaneously when said fuel lines are in communication;
synchronizing means for comparing the output voltages of said generators; and
means controlled by said synchronizing means for operating said valve means.

4. An electrical power generating system, comprising:
a plurality of electrical alternators;
a gas turbine coupled to each alternator for driving the latter;

each turbine including a fuel injection nozzle, a fuel supply line communicating to the nozzle, and a governor-controlled fuel metering valve in the fuel line;
an equalizing fuel line communicating the fuel supply line of said turbines between the fuel metering valves and fuel injection nozzles of the respective turbines;
valve means in said equalizing line for selectively isolating the fuel supply lines of said turbines from one another or placing said fuel supply lines in communication with one another, fluctuations in the supply of fuel to one turbine being transmitted to all turbines simultaneously when said fuel lines are in communication;
synchronizing means for sensing and comparing the phase angles, amplitudes, and frequencies of the output voltages of said alternators; and
means for operating said valve means to open the latter when the phase angles, amplitudes, and frequencies of said output voltages match one another.

5. An electrical power generating system, comprising:
a plurality of electrical alternators;
a gas turbine coupled to each alternator for driving the latter;
each turbine including a fuel injection nozzle, a fuel supply line communicating to the nozzle, and a governor-controlled fuel metering valve in the fuel line;
an equalizing fuel line communicating the fuel supply line of said turbines between the fuel metering valves and fuel injection nozzles of the respective turbines;
valve means in said equalizing line for selectively isolating the fuel supply lines of said turbines from one another or placing said fuel supply lines in communication with one another, fluctuations in the supply of fuel to one turbine being transmitted to all turbines simultaneously when said fuel lines are in communication;
synchronizing means for sensing and comparing the phase angles, amplitudes, and frequencies of the output voltages of said alternators; and
means controlled by said synchronizing means for operating said valve means to open the latter in response to matching of the phase angles, amplitudes, and frequencies of the alternator output voltages.

6. An electrical power generating system, comprising:
a plurality of electrical alternators;
a gas turbine coupled to each alternator for driving the latter;
each turbine including a fuel injection nozzle, a fuel supply line communicating to the nozzle, and a governor-controlled fuel metering valve in the fuel line;
an equalizing fuel line communicating the fuel supply line of said turbines between the fuel metering valves and fuel injection nozzles of the respective turbines;
valve means in said equalizing line for selectively isolating the fuel supply lines of said turbines from one another or placing said fuel supply lines in communication with one another, fluctuations in the supply of fuel to one turbine being transmitted to all turbines simultaneously when said fuel lines are in communication;
synchronizing means for sensing and comparing the phase angles, amplitudes, and frequencies of the output voltages of said alternators;
a load bus;
switch means coupled with said synchronizing means and including normally open contactors connected between said load bus and each alternator for electrically connecting the latter to said bus; and
means for operating said valve means to open the latter in response to closure of all said contactors.

7. An electrical power generating system, comprising:
a plurality of electrical alternators;
a gas turbine coupled to each alternator for driving the latter;
each turbine including a fuel injection nozzle, a fuel supply line communicating to the nozzle, and a governor-controlled fuel metering valve in the fuel line;
an equalizing fuel line communicating the fuel supply line of said turbines between the fuel metering valves and fuel injection nozzles of the respective turbines;
solenoid-operated valve means in said equalizing line for selectively isolating the fuel supply lines of said turbines from one another or placing said fuel supply lines in communication with one another, fluctuations in the supply of fuel to one turbine being transmitted to all turbines simultaneously when said fuel lines are in communication;
synchronizing means for sensing and comparing the phase angles, amplitudes, and frequencies of the output voltages of said alternators;
a load bus;
switch means coupled with said synchronizing means and including a first set of normally open electrical contactors for electrically connecting each alternator to said load bus;
an energizing circuit for said valve means including an electrical power source and a plurality of second sets of normally open electrical contactors connected in electrical series between said power source and valve means, whereby the latter is opened in response to simultaneous closure of said second contactor sets;
said second contactor sets being equal in number to the first sets of contactors and each second contactor set being associated with a particular set of first contactors; and
means for simultaneously closing each pair of associated first and second contactor sets.

8. An electrical power generating system, comprising:
a plurality of electrical alternators;
a gas turbine coupled to each alternator for driving the latter;
each turbine including a fuel injection nozzle, a fuel supply line communicating to the nozzle, and a governor-controlled fuel metering valve in the fuel line;
an equalizing fuel line communicating the fuel supply line of said turbines between the fuel metering valves and fuel injection nozzles of the respective turbines;
solenoid-operated valve means in said equalizing line for selectively isolating the fuel supply lines of said turbines from one another or placing said fuel supply lines in communication wtih one another, fluctuations in the supply of fuel to one turbine being transmitted to all turbines simultaneously when said fuel lines are in communication;
synchronizing means for sensing and comparing the phase angles, amplitudes, and frequencies of the output voltages of said alternators;
a load bus;
means including a first set of normally open electrical contactors for electrically connecting each alternator to said load bus;
an energizing circuit for said valve means including an electrical power source and a plurality of second sets of normally open electrical contactors connected in electrical series between said power source and valve means, whereby the latter is opened in response to simultaneous closure of said second contactor sets;
said second contactor sets being equal in number to the first sets of contactors and each second contactor set being associated with a particular set of first contactors; and
means controlled by said synchronizing means for closing all of the associated first and second contactor sets in response to matching of the phase angles, amplitudes, and frequencies of the alternator output voltages.

9. A power system according to claim 8 wherein:
said alternators are two in number; and said last mentioned means includes means controlled by said synchronizing means for closing the first and second contactor sets associated in one alternator in response to the output voltage of the latter alternator attaining a given amplitude and frequency, and means controlled by said synchronizing means for closing the first and second contactor sets associated with the other alternator in response to the phase angle, amplitude and frequency of the output voltage of the latter alternator matching the phase angle, amplitude, and frequency of the output voltage of said one alternator.

10. The method of operating a plurality of gas turbines arranged in parallel to share a common load and each having a fuel line containing a governor-controlled fuel metering valve, said method comprising the steps of:
    bringing said turbines up to desired operating speed;
    comparing the phase relationships of the output shafts of said gas turbines; and
    therafter placing the fuel lines of said turbines in communication with one another downstream of said fuel metering valves in response to a predetermined matching characteristic of said phase relationships.

11. The method of operating a plurality of gas turbines driving electrical generators, respectively, arranged in electrical parallel to share a common electrical load, each turbine having a fuel line and a governor-controlled fuel metering valve in the fuel line, said method comprising the steps of:
    bringing said turbines up to desired operating speed;
    comparing the output voltages of said generators; and
    placing said fuel lines in communication with one another downstream of said fuel metering valves in response to matching of said voltages.

12. The method of operating a plurality of gas turbines driving electrical alternators, respectively, arranged in parallel to share a common electrical load, each turbine having a fuel line and a governor-controlled fuel metering valve in the fuel line, said method comprising the steps of:
    bringing said turbines up to desired operating speed;
    comparing the phase angles, frequencies, and amplitudes of the alternator output voltages; and
    placing the fuel lines in communication with one another downstream of said fuel metering valves in response to matching of the phase angles, frequencies, and amplitudes of said output voltages.

References Cited by the Examiner
UNITED STATES PATENTS

| | | | |
|---|---|---|---|
| 2,768,504 | 10/1956 | Wente et al. | 60—97 X |
| 2,811,017 | 10/1957 | Reiners | 60—97 |
| 2,817,211 | 12/1957 | Reiners | 60—97 |
| 2,995,898 | 8/1961 | Thorner | 60—97 |

ORIS L. RADER, *Primary Examiner.*